United States Patent Office.

JOHN ROWSELL, OF CHICAGO, ILLINOIS, ASSIGNOR OF ONE-HALF TO DE GOLYER & BRO., OF SAME PLACE.

PROCESS OF BLEACHING, DEODORIZING, AND SWEETENING BENZINE.

SPECIFICATION forming part of Letters Patent No. 299,167, dated May 27, 1884.

Application filed March 24, 1883. Renewed March 31, 1884. (No specimens.)

*To all whom it may concern:*

Be it known that I, JOHN ROWSELL, of Chicago, in the county of Cook and State of Illinois, have invented certain new and useful Improvements in a Process of Bleaching, Deodorizing, and Sweetening Benzine; and I do hereby declare that the following is a full, clear, and exact description of the invention, which will enable others skilled in the art to which it appertains to make and use the same.

The object of my invention is to deodorize, bleach, and sweeten benzine.

Heretofore the petroleum-benzine known and used by the public in the various arts has had a peculiar and disagreeable odor, and has therefore been less extensively used where there was any possible substitute, whereas its adaptability for the purpose and its strength would have entitled it to the preference. This I accomplish by means of the following chemical agents, to wit: sulphuric acid, sal-soda or soda-ash, and ammonia, saltpeter, sugar of lead, and blue copperas, and a chromate or bichromate of sodium, potassium, or ammonium, the whole or part of which is used in the proportions and manner hereinafter fully set forth.

The receptacle in which this process is performed is commonly known in the laboratory as an "agitator," and has a funnel-shaped bottom with a cock at its lowest point, so that the chemical agents, after they have performed their respective functions, can be drawn off, leaving the benzine, which it is understood is of a specific gravity considerably less than water, in the same.

For the sake of convenience and perspicuity, the process is hereinafter set forth in five distinct and separate steps, after and between each of which it is preferably washed thoroughly with water, because while they all contribute to accomplish the purpose above set forth they each are performed separately and consecutively.

First. To a given quantity of naphtha I mix from two to twelve per cent. of sulphuric acid, preferably of 66° strength Baumé scale, according to the condition of naphtha, and then thoroughly agitate the mixture, and then when it has settled draw it off. This has the effect of cutting the naphtha and eliminating therefrom the carbolic acid, which, assimilating with the sulphuric acid, forms a dark resinous substance that gravitates to the bottom of the agitator when the agitation ceases. The removal of the carbolic acid takes from the naphtha that rank offensive smell. The benzine is then washed with sufficient water to remove the remaining traces of sulphuric acid or resinous substance, and is drawn off in the manner specified.

Second. As the application of sulphuric acid renders the naphtha or benzine sour, and as it is necessary to restore it to its normal taste, I make a solution of from one-tenth to one-fifth of one per cent. sal-soda or soda-ash, or any analogous alkali, and a comparatively small quantity of ammonia—say one-half gallon to 32.500 gallons of benzine—to neutralize the effect of the sulphuric acid. After a thorough mixing of this solution, it is also drawn off. Another washing is then resorted to to remove the traces of alkali.

Third. After the refuse water of the previous washing is drawn off, I make a solution of saltpeter and sulphuric acid in equal proportions, forming from two to twelve per cent. of the entire mass, which, when thoroughly agitated, removes the disagreeable benzine odor which has previously existed, and imparts a musk aroma to the same. When it has settled, it is drawn off. Another washing with water is resorted to to remove the saltpeter and sulphuric acid remaining.

Fourth. A solution of sugar of lead and blue copperas—say twenty-five pounds of the former and two pounds of the latter to every 32.500 gallons of benzine—is added and agitated to remove the acidity generated by the previous application of sulphuric acid, without destroying the sweet smell previously imparted to the mass. After the solution of sugar of lead and blue copperas is drawn off from the benzine, the latter is thoroughly washed.

Fifth. As a last application, to remove the last traces of sulphuric acid in so far as is possible and to bleach the benzine which has been discolored by contact with the chemicals hereinbefore specified, I mix and thoroughly agitate in the mass from one-tenth of one per cent. to three per cent. of a concentrated solution of a chromate or bichromate of either potassium, sodium, or ammonium, or about the same percentage of a concentrated solution of sugar of lead or barium nitrate or chloride of lime. After this solution is drawn off, an alkali is added to sweeten the benzine and destroy the last vestige of sulphuric acid. A final washing is then performed, whereby the whole mass is thoroughly cleansed. After the water is drawn off, the benzine is ready for the market.

It is known that chemical analogues could be substituted for many of the agents enumerated; but those would suggest themselves to a mind familiar with the subject of chemistry, and therefore come within the scope of my process.

The quantity of water used to wash the benzine after each application of the chemicals stated is immaterial, care being taken that enough be used to thoroughly wash the stuff. Neither is the time occupied in the performance of each step of importance, it varying from ten minutes to two hours, according to atmospheric pressure, temperature, &c.

What I claim as new, and desire to secure by Letters Patent, is—

1. The process of deodorizing, &c., petroleum-benzine wherein a given mass of the same is first treated to an application of sulphuric acid, then to a solution of a suitable alkali, and lastly to a solution of saltpeter and sulphuric acid, a washing with water being preferably resorted to after and between each of the aforesaid applications, said chemicals being used in the proportions and in the manner specified.

2. The process of deodorizing, &c., petroleum-benzine wherein a given mass is treated to, first, an application of sulphuric acid; second, an application of a solution of a suitable alkali; third, an application of a solution of saltpeter and sulphuric acid, and, fourth, an application of a solution of sugar of lead and blue copperas, all of which are used in the proportions and manner specified.

3. The process of treating petroleum-benzine wherein a given mass is treated first, to, an application of sulphuric acid; second, to a solution of a suitable alkali; third, to a solution of saltpeter and sulphuric acid; fourth, to a solution of sugar of lead and blue copperas, and, fifth, to an application of a chromate or bichromate of either potassium, sodium, or ammonium, said chemicals being used in the proportions and manner hereinbefore stated.

In testimony that I claim the foregoing as my own I hereunto affix my signature in presence of two witnesses.

JOHN ROWSELL.

Witnesses:
FRANK D. THOMASON,
CHARLES F. DeGOLYER.